United States Patent Office 3,478,516
Patented Nov. 18, 1969

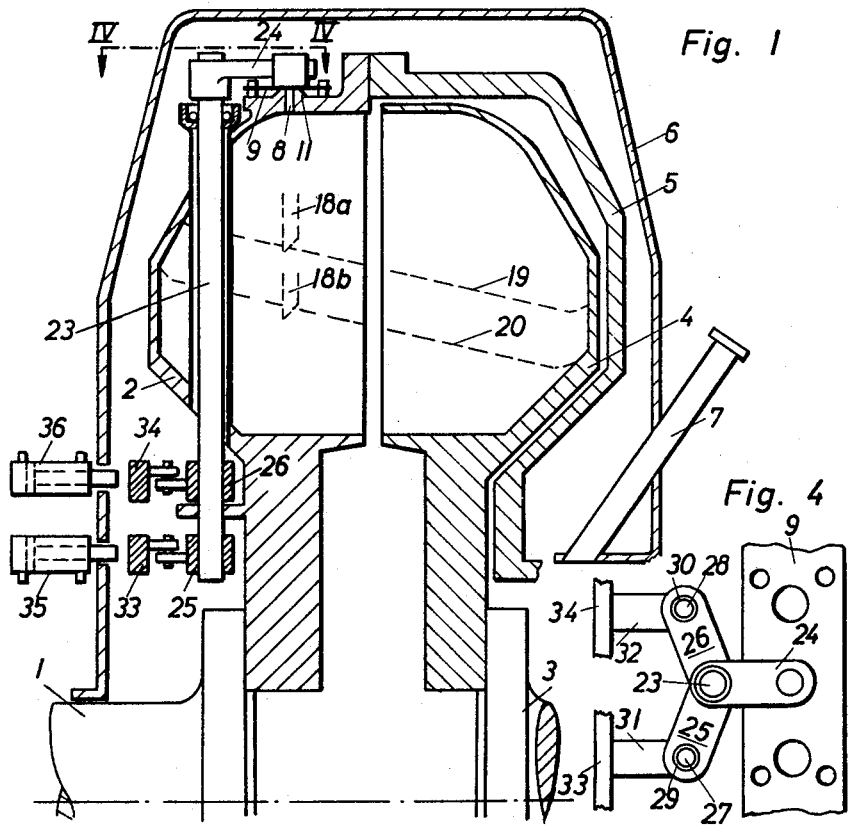
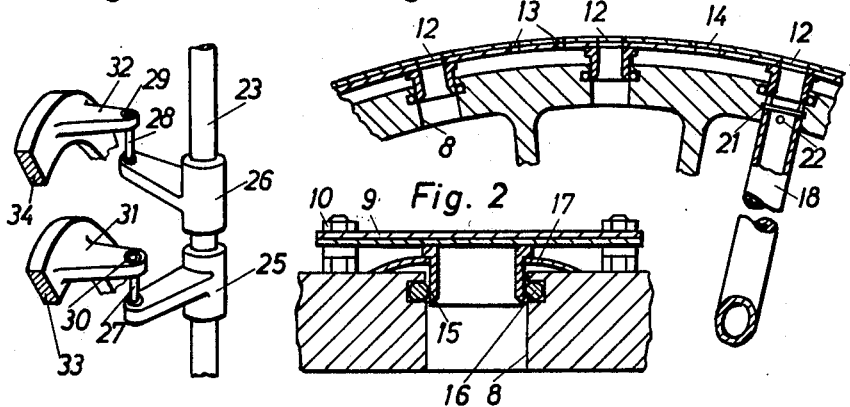

3,478,516
EMPTYING DEVICE FOR FLUID FLOW CIRCUITS
Gustav Bönsch, Heidenheim (Brenz), and Klaus Nolz, Crailsheim, Germany, assignors to Voith Getriebe KG, Heidenheim (Brenz), Germany
Filed Mar. 13, 1968, Ser. No. 712,732
Claims priority, application Germany, Mar. 22, 1967, 1,600,974
Int. Cl. F16d 33/18; F16h 41/30; F04d 29/00
U.S. Cl. 60—54                    14 Claims

ABSTRACT OF THE DISCLOSURE

An emptying device for fluid flow circuits, especially fluid couplings, with a rotatable housing having radially extending discharge openings controlled by a flexible spring elastic band, preferably a spring steel band, which is circumferentially displaceable on said housing.

---

The present invention relates to a device for emptying fluid flow circuits, especially fluid couplings, which device is provided with outlet passages for the working fluid which are arranged in a housing connected to the input or output shaft. Said device is also provided with a displaceable control ring for controlling said outlet passages. Emptying devices of this type for turning off or controlling the torque and slip have heretofore been designed as rigid shut-off valves which, in view of their mass and for purposes of avoiding tilting, require very strong guiding and actuating means. More specifically, devices of this type are disclosed in German Patents 422,053, 415,002 and 712,767.

Aside from the fact that heavy and expensive designs are necessary, such rigid annular slides or valves will, due to their great masses, also produce considerable mass forces when disuniformities in the angular velocity occur during the operation as may be the case, for instance, when employing internal combustion engines as driving engines or when for other reasons variations in the torque will occur.

In this connection also shut-off rings are known which are displaceable in axial direction and which are associated with radial outlet openings, and there are also known rings which are displaceable in circumferential direction for closing axis-parallel discharge openings. For purposes of avoiding large masses of such shut-off valves, it is also known to make the same of a material having a lower specific weight than steel, but such slides or valves have their sliding surfaces armed with wear-resistant fittings so that the employment of such designs is not recommended. The heretofore known emptying devices of the above mentioned type additionally have the drawback that they have a relatively high inertia so that they do not permit a precise adjustment of the partial degree of filling of the fluid flow circuits to be controlled.

It is, therefore, an object of the present invention to provide an emptying device of the above mentioned general type which will overcome the drawbacks set forth above.

It is another object of this invention to provide an emptying device for fluid flow circuits which will be relatively light and will permit a precise adjustment of the desired degree of filling.

These and other objects and advantages of the invention will appear more clearly from the following specification in connection with the accompanying drawing, in which:

FIG. 1 represents an axial section through a fluid coupling provided with an emptying device according to the present invention.

FIG. 2 illustrates on a somewhat larger scale than FIG. 1 a longitudinal section through an outlet opening of the fluid coupling of FIG. 1.

FIG. 3 illustrates a section taken perpendicularly to the coupling axis through a plurality of outlet passages but on a scale different from that of FIG. 3.

FIG. 4 is a partial view along the line IV—IV of FIG. 1.

FIG. 5 is an isometric view of the inner end of an adjusting shaft.

According to the present invention, the outlet openings of the fluid circuit are in a manner known per se radially arranged and have associated therewith a shut-off valve of a flexible spring elastic band of corresponding resistant material, preferably spring steel, said band being displaceable in circumferential direction. In this connection the displaceability is of particular importance in view of the fact that a bendng or spring elastic annular band with its low strength in radial direction could be controlled in axial direction merely by a complicated axial displacing device connected to a plurality of circumferential areas, whereas with a simple adjusting device a tilting and unilateral displacement of such band would be encountered. In circumferential direction, however, such spring or bending elastic band can reliably be actuated by a simple adjusting device. With the above mentioned heretofore known embodiment with a ring displaceable in circumferential direction as disclosed in German Patent 415,002, the said ring is associated with axis-parallel outlet openings and is therefore arranged on edge, which means in an axis-vertical plane so that the said ring will have a great strength in radial direction in contrast to the suggestion according to the present invention, in which the shut-off ring is relatively soft and yieldable in radial direction.

For purposes of increasing the bending elasticity of the shut-off ring, the ring may be formed of a plurality of layer of relatively thin bands. Such plurality of layers may be obtained by a plurality of continuous windings.

According to a further particularly advantageous embodiment of the present invention, the bending elastic band is placed around the housing with said outlet openings at a greater play than is actually necessary for the adjustability, and the play between housing and band is bridged by sliding jaws which are uniformly distributed over the circumference and are connected either to the housing or to the band. Such sliding members yield a twofold advantage. On one hand they bring about a considerable reduction in the frictional resistance during the adjustment and thereby reduce the force necessary for the adjustment, and on the other hand such sliding members will assure that slight impurities in the transmission oil used for such fluid flow circuits will not cause any disorders as would be the case if the band would tightly engage the housing. As a result thereof, the shut-off ring can be applied with greater tolerance which reduces the production costs. The sliding members are advantageously arranged at the marginal areas of the correspondingly wide band in such a way that during an adjustment they will laterally slide past the openings to be controlled and will yield a wide track mounting. As sliding members there may be used in a particularly simple manner the heads of screws or rivets inserted into the band which, when a multilayer band is employed, may also serve for interconnecting the layers.

The distance between the outer wall of the housing and the shut-off ring as caused by the sliding members may be bridged within the range of the openings by a corresponding flat-topped ridge encircling the housing within within the range of the openings or by narrow annular members on the openings themselves. However, it is particularly expedient for this purpose to insert radially displaceable bushings into the outlet openings, said bushings being adapted under the influence of centrifugal forces sealingly to engage the shut-off ring. If necessary, the engaging surface of the bushings may be curved in conformity with the curvature of the shut-off ring. However, experience has shown that this is not necessary when employing a correspondingly thin band because the latter will tightly engage a plane outer surface of the bushing. The higher the speed of the fluid flow circuit and the higher the fluid pressure in the working chamber thereof, the stronger will the annular outer surface of the bushing sealingly engage the shut-off ring.

The bushings in their turn are expediently sealed with regard to the housing of the fluid flow circuit by means of elastic sealing rings. In order to assure that a good seal between the bushings and the shut-off ring will also be realized at a standstill and at low speeds, it is advantageous to preload the bushings by springs.

The present invention may also be applied to fluid flow circuits in which it is desired to adjust not only the conditions of operation "full" and "empty," but also any desired partial degree of filling including fluid flow circuits in which the partial degrees of filling have to be adjusted at high precision. To this end, at least two groups of outlet passages on the housing and/or the shut-off ring are provided which in response to an actuation of the shut-off ring become successively effective so that in addition to the closing position at least two positions with differently open outlet cross section are obtained for the discharge of the working fluid. When the quantity of oncoming fluid remains the same, an equilibrium will be obtained in conformity with the desired discharge cross-section after the desired degree of emptying has been realized in view of the discharge pressure which is reduced when the filling is reduced. Such control which might suggest itself is, however, not always satisfactory since, among other things, it is temperature sensitive and since it is dependent with regard to precision also on a certain constant inflow and outflow which cannot always be maintained.

For purposes of avoiding the above drawbacks, the present invention suggests a further development which supplements the advantageous design of the emptying device according to the present invention in an ideal manner when it can be employed fundamentally also with other designs of the emptying device. According to this further development, it is suggested to design preferably all of the outlet openings in the housing and in the shut-off ring with the same cross-section but to connect individual outlet openings in the housing with substantially radially inwardly extending pipe sections which act as overflow pipes and due to their length will assure a certain fluid level in the working chamber and thereby a certain partial degree of filling.

According to this suggestion of the invention, in addition to the outlet openings in the housing for the complete emptying of the working chamber, which openings are closed by the shut-off ring at a certain circumferential position thereof and are freed by said shut-off ring in another position thereof, there is provided at least one further group of additional outlet openings. Connected to these additional outlet openings are inwardly extending overflow pipes which in an additional position of the shut-ring or shut-off valve will permit an emptying of the working chamber in conformity with the depth of immersion of said overflow pipes into the working circuit. Depending on the number of groups of different overflow pipes and on the corresponding number of positions of the shut-off valves, a plurality of partial degrees of filling may be set with geometric precision. In this connection it is advantageous to shape the open entrance cross-sections of the overflow pipes in conformity with the flow shapes which are different with different degrees of filling. Preferably, said entrance cross-sections are so shaped that their openings are directed against the flow. For instance, the overflow pipes may at the entrance cross-section be cut on a slant so that they will act not only as overflow pipes but also as damming-up pipes.

The cooling of the fluid medium, as customary with fluid flow circuits, by continuously drawing off a partial flow of the fluid medium and cooling said partial flow in a cooler is, of course, also possible with the emptying arrangement according to the present invention. To this end, continuously open outlet openings may be arranged adjacent to the shut-off valve, or continuously open outlet openings may be provided within the area of the shut-off valve.

According to a specific embodiment of the invention, the shut-off valve may also be employed for controlling the said outlet openings for a continuous discharge of a partial quantity of fluid. This may be effected, for instance, in such a way that at a position of the shut-off valve in conformity with a certain partial degree of filling of the working chamber a different outlet cross-section is freed than is the case with a full circuit or with another partial degree of filling. The arrangement may be such that at least individual small discharge nozzles on the shut-off ring will with the adjustment of the latter for a certain partial degree of filling move into the range of the outlet openings on the housing which serve for the complete emptying of the working chamber, and in conditions of partial filling and the greater heat development inherent thereto will free an additional discharge quantity of fluid.

It is, of course, to be understood that the partial fluid flow which serves for cooling may also be conveyed through the other outlet openings or overflow pipes.

A further development of the present invention consists in the device for actuating the shut-off ring designed as bending elastic band and adjustable in circumferential direction. More specifically, according to the invention, at least two oppositely located areas of the fluid flow circuit, preferably however at three of four uniformly distributed areas of the fluid flow circuit, there are journalled radially extending adjusting shafts the outer end of which engage the shut-off ring by means of a lever connected thereto whereas their inner end carries two slightly spaced levers which are so arranged that the adjusting shafts are by a force acting upon one of said levers in axial direction turned in one direction and by a force acting upon the other lever in axial direction are turned in the other direction. By turning the adjusting shafts, the shut-off ring will through the intervention of the outer lever be displaced in one or the other circumferential direction. The arrangement is such that the two levers at the inner end of an adjusting shaft form approximately an image with regard to each other in respect to a plane passing through the axis of the adjusting shaft and the axis of the fluid flow circuit, said shafts extending outwardly. In this connection it is advantageous to have the end of one lever engage a ball bushing through the intervention of a pin parallel to the adjusting shaft. The said bushing is connected to a control ring which is coaxial to the fluid flow circuit and is supported by the corresponding levers of the adjusting shaft so as to rotate with the fluid flow circuit. The respective other lever is in a similar manner coupled to a second control ring. By means of a stationary servo-motor or the like acting in axial direction and having its outwardly effective piston rod provided with a roller, it is possible at will to displace one or the other control ring by a short push toward the fluid flow circuit whereby the actuation of the shut-off ring is effected in one or the other direction. With an arrangement having one or more intermediate positions of the shut-off ring, also a corresponding number of intermediate positions is to be provided for the stroke of the servo-motors.

Referring now to the drawing in detail, the most important elements of the fluid coupling shown in FIG. 1 are the drive shaft 1, the pump wheel 2 connected to said drive shaft 1, the output shaft 3, the turbine wheel 4 coupled to said output shaft 3, and a cup or bowl 5 connected to said pump wheel 2 and surrounding the turbine wheel 4. The coupling elements are enclosed by a housing 6 into which the oil supply conduit 7 leads.

From the working chamber formed by the pump wheel 2 and the turbine wheel 4 and, more specifically, from the outer circumferential area of said working chamber, bores 8 lead to the outside and serve as outlet openings. These outlet openings are controlled by an elastic band 9 of spring steel which passes around the outer circumference of the pump wheel and has its ends connected to each other. The elastic band 9 thus forms the circumferentially displaceable shut-off valve or shut-off ring. In order to furnish a picture of the thickness of said band, it may be mentioned that with a coupling diameter of approximately 700 millimeters, a single layer of said band may have a thickness of 0.8 millimeter and a width of 50 millimeters, whereas for a coupling having for instance a diameter of 2000 millimeters four layers of a one millimeter thick and 130 millimeters wide band are superimposed upon each other.

The marginal areas of the band 9 are provided with rivets or screws 10 the inner heads of which rest upon the pump wheel 2. The gap between the band and the pump wheel as caused by the heads of the screws is at the outlet passages bridged by a ridge 11 on the pump wheel to avoid the possibility of non-tightness exceeding permissible limits. According to another possibility, circular bushings may be provided at each outlet openings. As will be seen from FIG. 3, the band 9 is at suitable portions distributed over the circumference provided with bores 12, 13 and 14 through which the working fluid may flow off when the band, by a displacement in circumferential direction, is so adjusted that these bores 12 are in alignment with the outlet passages 8.

According to the embodiment shown in the partial view of FIG. 2, the band 9 is wound in two layers, and the gap between band and pump housing is bridged by bushings 15 which are inserted into the outlet openings 8 and are sealed relative thereto by a seal 16. The outer end of bushings 15 has a collar against which rests a leaf spring 17. By means of this leaf spring 17 the bushings are urged radially outwardly to engage the band.

According to the embodiment shown in FIG. 3, one of the outlet openings 8 illustrated therein is connected to an inwardly extending overflow pipe 18. The inner end of this overflow pipe is, in conformity with FIG. 1, indicated in two different lengths 18a and 18b, and it is shown that in conformity with the length 18a during the operation of the coupling a fluid level will be obtained which is indicated by the line 19 whereas with the length 18b of the overflow pipe, the fluid level indicated by the line 20 will be obtained. The overflow pipe 18 is cut off at an incline at the inner end so that the flow is directed against the opening.

The bores in band 9 are so arranged that in one position of the band they cover up all outlet openings in the working circuit except the openings 13 which are always open for the necessary cooling. According to a second position, the outlet openings are freed for a quick complete emptying. Depending on the requirements, further positions for the partial degrees of filling may be provided in which the band frees the respective outlet passages to which the overflow pipes 18a are connected or those outlet passages to which the overflow pipes 18b are connected.

As will be seen from FIG. 3, the design is so selected that the overflow pipe can be inserted from the outside through the outlet opening. The overflow pipe is held in its respective position by a holding ring 21 and a pin 22. With this design it is possible to withdraw the overflow pipe without the necessity of disassembling the fluid flow circuit for purposes of cleaning the overflow pipe or replacing the same by a pipe of different length.

For purposes of actuating the shut-off ring formed by the band 9, the pump wheel has rotatably journalled therein and uniformly distributed over its circumference a plurality of radial control shafts 23 the outer ends of which are linked to the control ring by means of a lever 24 connected to said outer end. At the inner end of the control shafts there are provided adjacent to each other two levers 25 and 26 which in the form of an image to each other are inclined relative to the drawing plane in forward and rearward direction. The free ends of these levers 25 and 26 are each provided with a pin 27, 28 which is parallel to the control shaft and engages a ball bushing 29, 30 respectively. This bushing is located in an axis-parallel arm 31, 32 of a control ring 33, 34 which is coaxial to the coupling axis and is supported by the levers 25 and 26 respectively. By displacing the ring 33 by means of a stationary servi-motor 35 toward the right, the control shaft 23 is turned in one direction, and the displacement of the ring 34 by means of a further stationary servo-motor 36 brings about the displacement of the control shaft 23 in the other direction thereby controlling the shut-off valve accordingly. It is advantageous, instead of a servo-motor 35, 36 to employ two servo-motors which are located precisely opposite to each other with regard to the axis.

It is, of course, to be understood that the present invention is, by no means, limited to the particular embodiments set forth above but also comprises any modifications within the scope of the appended claims.

What we claim is:

1. A device for emptying a fluid flow circuit, especially a fluid coupling, with rotatable housing means having circumferentially arranged discharge conduit means extending through said housing means for communication with said fluid flow circuit, which includes: flexible spring elastic band means coaxially arranged with regard to said housing means and having spaced passage means therethrough located in the same circumferential area of said housing means which contains said discharge conduit means, said discharge conduit means extending radially with regard to said housing means, and control means operatively connected to said band means for selectively adjusting the same in the longitudinal direction thereof for selectively closing off said discharge conduit means or sligning the same with said passage means.

2. A device according to claim 1, in which said spring elastic band is of spring steel.

3. A device according to claim 1, in which said spring elastic band means is formed by a plurality of superimposed layers of a relatively thin band.

4. A device according to claim 1, which includes elevational means located around the outer mouths of said conduit means and engaged by the inner surface of said band means, and supporting means arranged near the marginal areas of said band means between the latter and the adjacent housing portions outside said elevational means.

5. A device according to claim 4, in which said elevational means are formed by bushing means, and which includes spring means continuously urging said bushing means in radially outward direction.

6. A device according to claim 5, which includes sealing ring means for sealing said bushing means relative to said housing means.

7. A device according to claim 4, in which said elevational means are formed by the heads of connecting means selected from the group consisting of screws and rivets.

8. A device according to claim 4, in which said spring elastic band means has a plurality of superimposed layers interconnected by said connecting means.

9. A device according to claim 1, in which said passage means in said band means comprises at least two groups of different diameter passage means.

10. A device according to claim 1, which includes overflow pipe means connected to at least one of said conduit means and extending therefrom inwardly into said fluid flow circuit.

11. A device according to claim 1, which includes a plurality of overflow pipe means respectively connected to a plurality of said conduit means and respectively extending therefrom inwardly into said fluid flow circuit to a different extent.

12. A device according to claim 1, in which said rotatable housing means is provided with peripheral additional passage means for continuously passing fluid therethrough from said fluid flow circuit for cooling said fluid, the effective cross section of said additional passage means exceeding the effective cross section of said conduit means when said band means occupies a position for partial as well as for total filling of said fluid flow circuit.

13. A device according to claim 1, in which said control means operatively connected to said band means includes: a plurality of control shafts uniformly distributed over said rotatable housing means and journalled thereon, first lever means having the outer end thereof linked to said band means and having the other end of said lever means connected to the outer end of the respective adjacent control shaft, a plurality of pairs of second lever means respectively connected to the inner end of the respective adjacent control shaft, and means operable selectively to act upon one second lever means of the respective lever pair for turning the respective adjacent control shaft in one direction and to act upon the other second lever means of the same pair for turning the same control shaft in the opposite direction.

14. A device according to claim 13, which includes control rings respectively operatively connected to the second lever means of each pair of second lever means, pin means carried by said pairs of second lever means, and ball bushing means carried by said control rings and engaged by said pin means to effect the operative connection between said control rings and said pairs of second lever means.

References Cited

UNITED STATES PATENTS

| | | | |
|---|---|---|---|
| 1,860,701 | 5/1932 | Bauer et al. | 60—54 |
| 2,024,842 | 12/1935 | Bauer et al. | 60—54 |
| 2,631,432 | 3/1953 | Newcomb | 60—54 |
| 3,020,719 | 2/1962 | Seibold et al. | 60—54 |
| 3,091,430 | 5/1963 | Thomas | 60—54 XR |
| 3,403,514 | 10/1968 | James | 60—54 |

EDGAR W. GEOGHEGAN, Primary Examiner

U.S. Cl. X.R.

103—115